Figure 1:
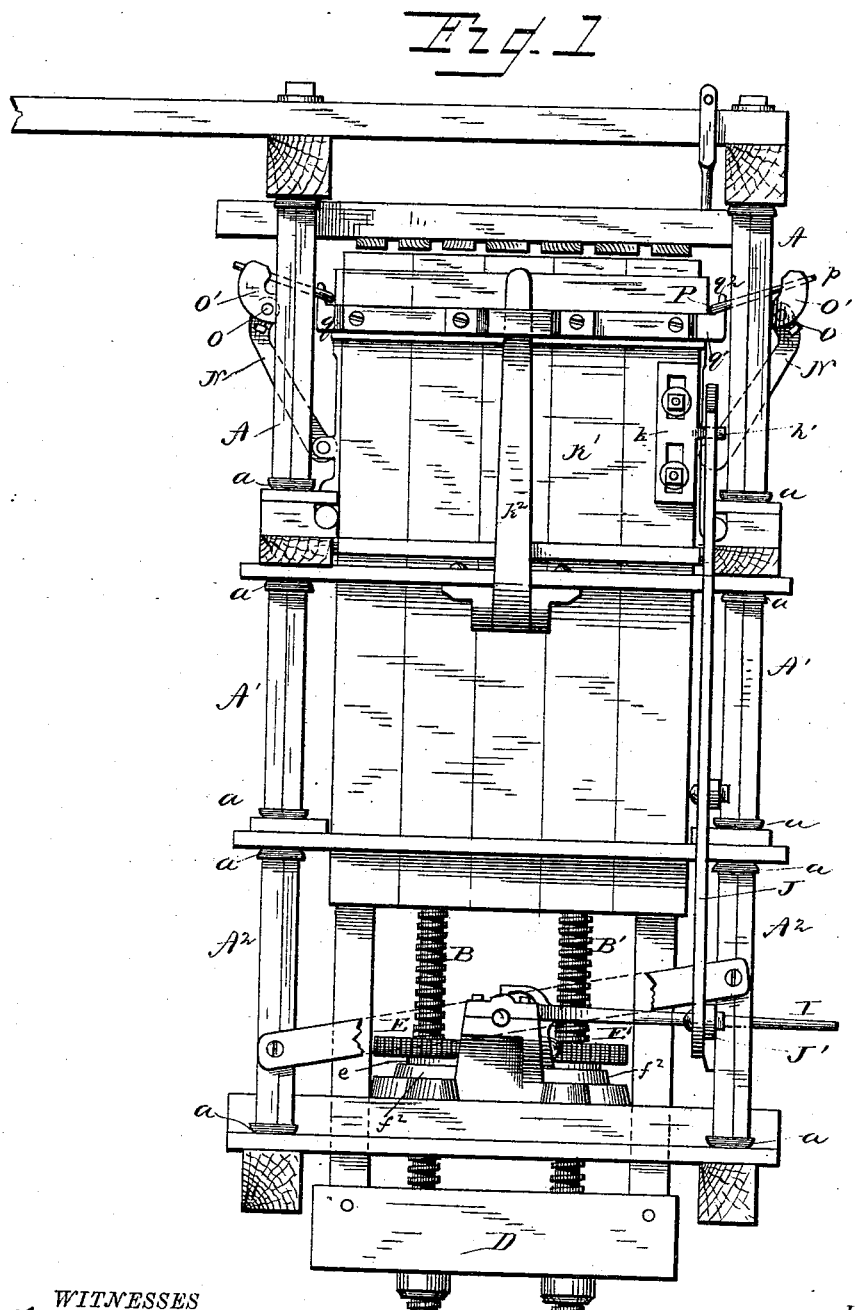

(No Model.) 4 Sheets—Sheet 1.

W. J. F. LIDDELL.
HAY AND COTTON PRESS.

No. 272,719. Patented Feb. 20, 1883.

WITNESSES
Franck L. Durand.
Rex Smith

INVENTOR
W. J. F. Liddell
by A. M. Smith
Attorney (No Model.)
W. J. F. LIDDELL.
HAY AND COTTON PRESS.
No. 272,719.   Patented Feb. 20, 1883.
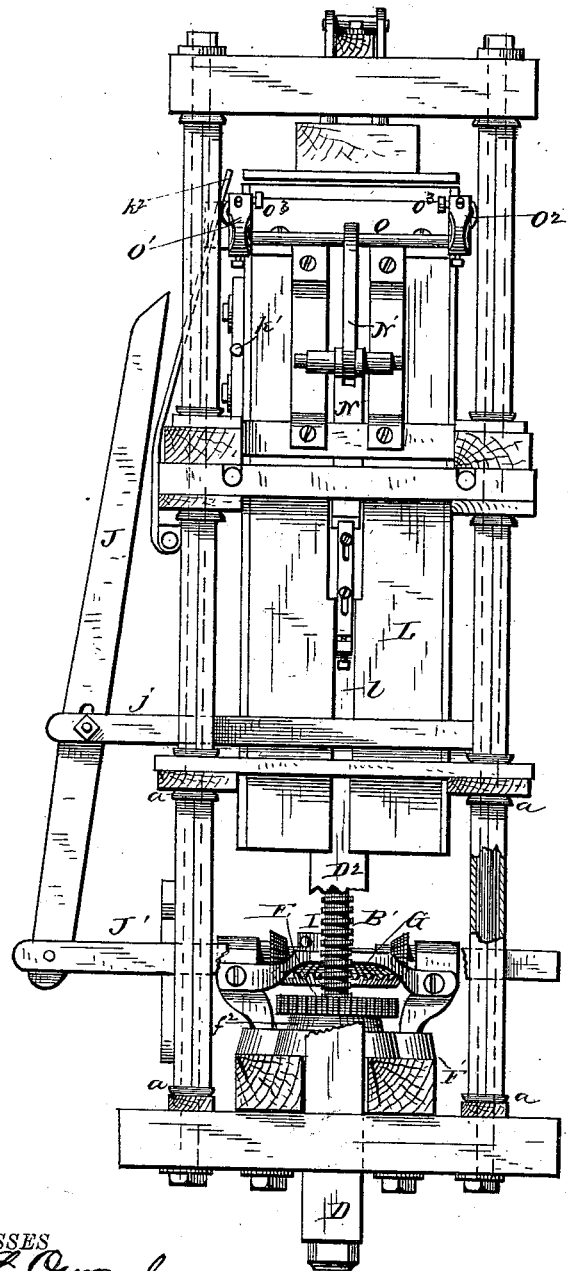
WITNESSES
INVENTOR

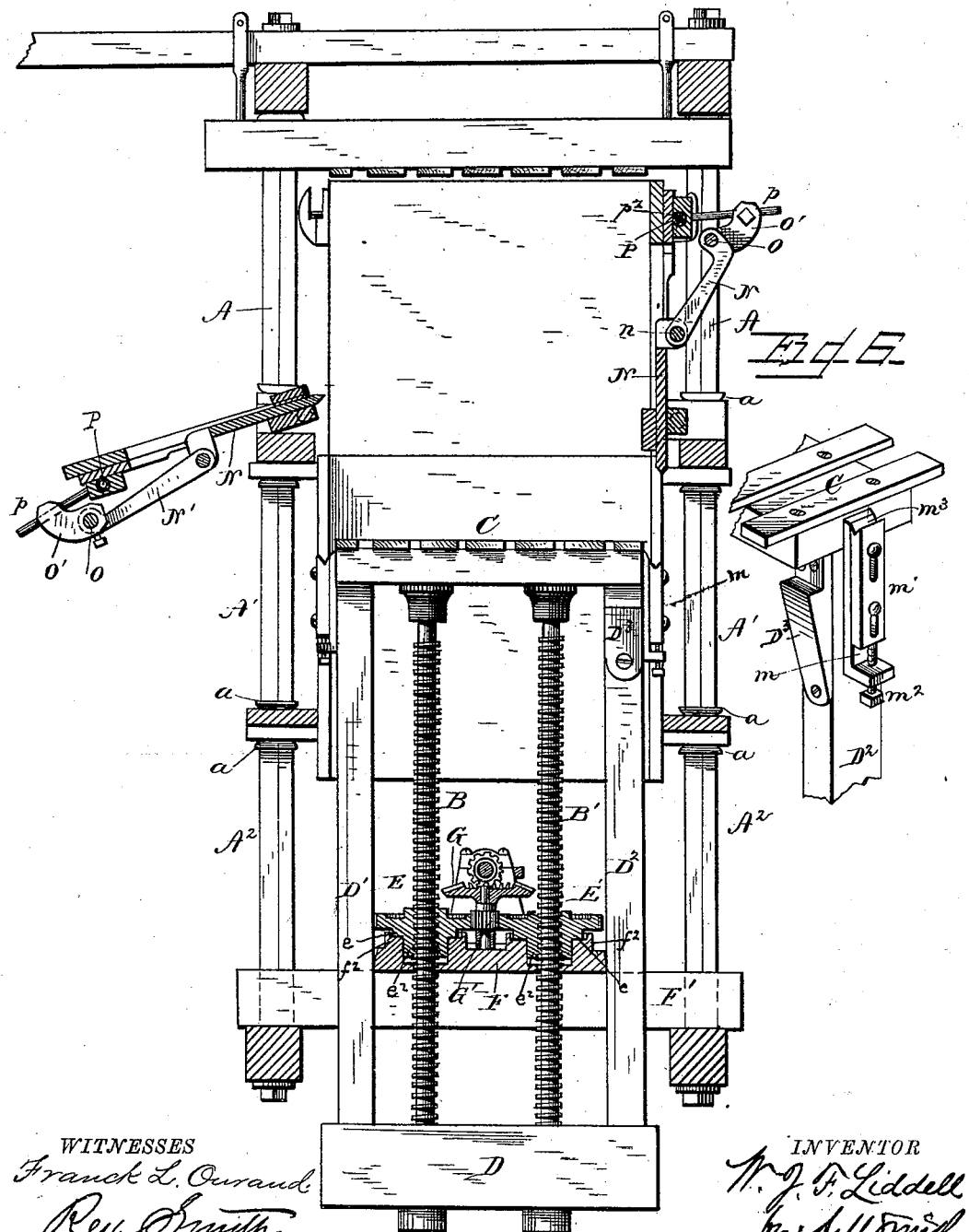

(No Model.) 4 Sheets—Sheet 4.
W. J. F. LIDDELL.
HAY AND COTTON PRESS.
No. 272,719. Patented Feb. 20, 1883.
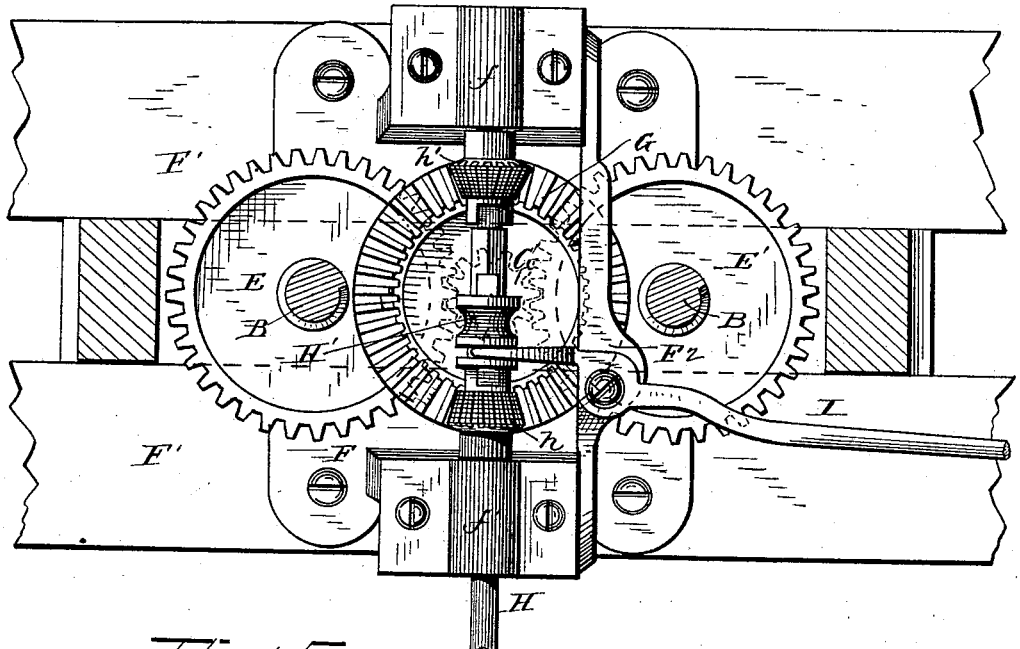
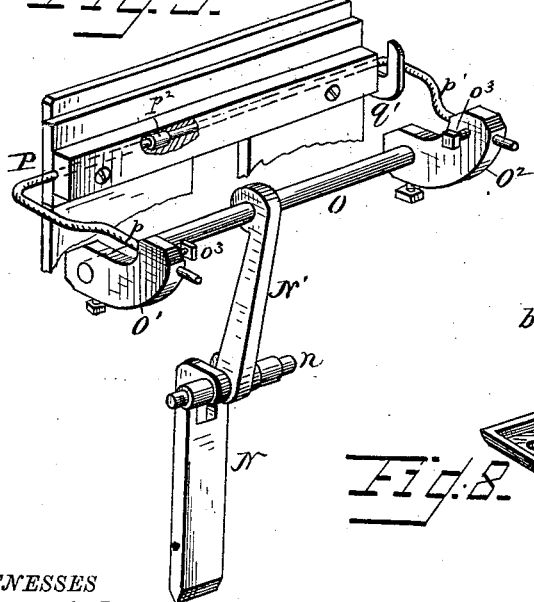
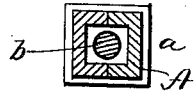
WITNESSES
Franck L. Ourand
Rex. Smith
INVENTOR
W. J. F. Liddell
by A. M. Smith
Attorney

UNITED STATES PATENT OFFICE.

WALTER J. F. LIDDELL, OF CHARLOTTE, NORTH CAROLINA.

HAY AND COTTON PRESS.

SPECIFICATION forming part of Letters Patent No. 272,719, dated February 20, 1883.

Application filed December 8, 1882. (No model.)

*To all whom it may concern:*

Be it known that I, WALTER J. F. LIDDELL, of Charlotte, county of Mecklenburg, State of North Carolina, have invented a new and useful Improvement in Hay and Cotton Presses, of which the following is a full, clear, and exact description, reference being had to the accompanying drawings, making part of this specification.

My invention relates to a novel arrangement of mechanism for actuating the movable bed or platen, to the means for automatically releasing the sides or doors of the compressing-chamber for removing the bale after the operation of compressing the same is completed and for simultaneously reversing the action of the compressing mechanism, and to certain details of construction and arrangement hereinafter described.

In the accompanying drawings, Figure 1 is a front elevation of my improved press. Fig. 2 is a side elevation of the same, with one of the bars connecting the movable bed or platen with its actuating cross-head broken away in part to show the arrangement of the gearing. Fig. 3 is a vertical transverse section of the press. Fig. 4 is a plan view of the gearing. Fig. 5 is a detail view, in perspective, of one of the latch-bars and its actuating-rod. Fig. 6 is a similar view of a portion of one of the compressing rods or bars and its adjustable plate for actuating the latch-rod. Fig. 7 is a transverse section through one of the divided frame-posts and its through rod or bolt, and Fig. 8 is a plan view of one of the socket-plates in which the ends of said post-sections are clamped.

The press, in its organization or general arrangement of parts, is similar to that upon which Letters Patent were granted to me April 8, 1879, No. 214,046, and need not therefore be described in detail further than is necessary to an understanding of my present improvements. In the patent referred to the corner-posts or uprights of the press-frame were described and shown as made in short sections having a central bore or perforation, through which they were united to each other and to the interposed and upper and lower horizontal timbers by through-bolts. In the present construction these upright sections (indicated at A A' A²) are divided longitudinally, and have their ends beveled slightly on their faces and fitted into perforated cups $a$, having flaring walls, as shown in Fig. 8, which serve, when the parts of the frame are drawn together by through upright bolts $b$, to clamp the two parts of the post together and to hold them firmly and solidly in place. This construction facilitates the removal and renewal of the parts, as it is only necessary to loosen the bolt, whereas in the former construction it was necessary to remove the bolt for that purpose.

The screws actuating the movable bed or platen in the patent referred to were made to act with a thrust movement thereon, whereas in the present construction they are made to act upon a cross-head, with which said bed or platen is connected, with a drawing movement, as will be explained, thereby securing greater ease and steadiness of movement. The screws indicated at B B' extend between the platen C at their upper ends and a cross-head, D, at their lower ends, passing through the latter and being firmly secured thereto by nuts at their lower ends, as shown, the upper ends of the screws resting in socket-pieces secured to the lower face of the platen C.

The ends of the cross-head D are rigidly connected with the platen C by upright bars D' D², and the screws pass through spur-wheels E and E', having each a central perforation, the walls of which are threaded to match the screws, said screws acting as rotating nuts thereon. These wheels have hubs on their lower faces, surrounding their central perforations and forming portions of the nut referred to, and these hubs are stepped in sockets in a gear-plate, F, secured to transverse frame-bars F', as shown.

The weight of the cross-head D and the platen C and their connecting bars or timbers D' D², acting through the screws B B', serves effectually to hold the hubs of the wheels E and E' down in their bearing-sockets, and the latter acting through the screws on the cross-head D, and thence through the uprights D' and D² on the platen for compressing a bale, it will be seen that the screws are made to act with a drawing instead of thrusting action, as in the ordinary arrangement of these screws.

This, in connection with the construction of the compressing-frame and the manner of connecting the screws therewith and with the platen, secures great ease and steadiness of movement of the latter.

The hubs of the wheels E and E', at their lower ends, are reduced in external diameter, forming sleeves $e^2$, which fit into sockets formed in the gear-plate F, as shown, being somewhat shorter than the sockets, so as not to rest on the bottom thereof. The socket for the reception of the hub itself is somewhat enlarged, so that while the larger portion $e$ of the hub rests on an annular rabbeted flange, $f^2$, forming the socket sustaining the downward thrust, the sleeve $e^2$ sustains the lateral thrust of the gears and forms a smaller frictional surface than if the larger hub itself were made to sustain such lateral thrust.

The gear-wheels E and E' engage with an intermediate pinion, G', rigidly secured to the hub or lower face of a bevel-wheel, G, mounted and turning on an upright stud or pin secured to the gear-plate F, and in suitable bearings, $f f'$, on said gear-plate is mounted a horizontal shaft, H, provided near each end adjacent to the bearings with bevel-pinions $h$ and $h'$, mounted loosely on said shaft and engaging with a bevel-wheel, G, on opposite sides, as shown. These bevel-pinions are provided on their adjacent sides with clutch-faces, and interposed between them, upon a square or feathered shaft, H, is a sliding clutch-sleeve, H', having a clutch-face at each end, adapting it to engage and drive either pinion $h$ or $h'$, as may be desired, for changing the direction of rotation of the bevel-wheel G and of the gearing operated thereby. One end of the shaft H extends beyond its bearing, and may be provided with a hand-wheel or other suitable means through which it may be connected with the driving-power.

The clutch-sleeve H' is grooved to receive the fork of a shifting-lever, I, connected by a vertical pivot with a suitable support or bracket, $F^2$, attached to the gear-plate F. This lever I extends beyond its pivot, said extension forming a handle for shifting the clutch-sleeve H' and changing the direction of movement of the parts, or for throwing out of gear, and passes through an eye in a link, J', connected at its outer end with the lower end of an upright lever, J, pivoted near the center of its length to the projecting end of a horizontal arm or bar, $j$, attached to the frame-work of the machine. The upper end of this lever extends upward far enough to be acted upon by a pin, $k'$, connected with one end of the front door, K, of the press, as the latter opens outward to release the bale. The pin $k'$ is formed upon and projects laterally from a slotted plate, $k$, attached to the door K by bolts or headed screws, which permit its adjustment up and down on said door for increasing or diminishing its distance from the pivot connecting said door at its lower edge with the frame. As the door is thrown open or down, turning on said pivot, the pin $k'$ strikes the upper end of the lever J, moving it outward, and the latter, acting through the link J' on the lever I and the clutch-sleeve H', causes said sleeve to be thrown out of engagement with the pinion $h'$ and into engagement with the pinion $h$, reversing the direction of rotation of the wheel G and of the mechanism and platen or plunger C operated thereby, and lowering the latter for adapting the press to receive a new charge.

The door K has a spring, $k^2$, connected with it in any suitable manner, so that when the door is released, as hereinafter explained, it will be thrown open or down by the action of said spring, thus causing the pin $k'$ to act upon the lever J, as described. The pin is made adjustable, as explained, to adapt it to be set to give the required throw to the clutch H'. After the press has been recharged and the doors closed the movement inward of the upper end of the lever J again reverses the movement of the plunger and sets the lever in position to be again acted upon by the door, as described.

The side or end walls, L, of the compressing-chamber are provided with vertical slots $l$, covered inside by the upright bars D' $D^2$; and secured to said bars, and moving up and down in said slots on each side, is an angular bracket, $m$, on the outer vertical face of which is a vertically-slotted block, $m'$, secured thereto by headed pins or screws. The lower horizontal foot of the bracket $m$ is perforated and provided with a set-screw, $m^2$, by the adjustment of which the block $m'$ can be set higher or lower, as may be desired. The upper end of the block $m'$ has a V-shaped notch, $m^3$, in it, which forms a seat for the lower end of a vertical slide-bar, N, moving in suitable ways on the side doors, K'.

To the upper end of the slide N a link or rod, N', is connected by a horizontal pin or pivot, $n$, and the upper end of this link N' is connected with a horizontal rod or bar, O, extending the full width of the door K' at its upper end and parallel with its outer face. The ends of rod or bar O are provided with curved arms O' $O^2$, perforated at their outer upper ends to receive the ends of an angular latch-rod, P. The perforations in the arms O' $O^2$ are at right angles to the bar O, and the bent or angular ends $p$ $p'$, passing through said perforations, are secured therein by set-screws $o^3$, permitting their adjustment.

The rod P turns in bearings on the door K', near its upper end, (shown in Fig. 5,) adapting its ends or arms $p$ and $p'$, by the movement of the slide N, to be rocked up from a horizontal position to a vertical or nearly vertical position for releasing or unlocking the press-doors. A collar, $p^2$, on the latch-rod P secure the latter against end-play in its bearings.

The front and rear doors are provided with hooks or angle-irons $q$ $q'$, the horizontal arms of which are bolted or otherwise firmly secured to said doors at their ends and near their upper edge, as shown, and the hook portions $q^2$ thereof project above the plane of the latch-rod P, and are outside of said rod when the doors are closed, and when the arms $p$ $p'$ are rocked down into a horizontal position, or nearly so, they pass down outside of the hooks $q^2$, locking the front and rear doors, and the rod P, lying within said hooks, serves to lock the end doors.

In operation the movement of the bars $D'$ $D^2$ as they approach the end of their upward or compressing throw acts through the block $m'$ upon the slide N, and through the latter and the link $N'$ and rod O, with its arms $O'O^2$, on the arms $p$ and $p'$ of the latch-rod P, until said arms are rocked upward sufficiently to release the hooks $q^2$, and therewith the front and rear doors, and the falling or throwing down of the former acts on the lever J for reversing the movement of the plunger, as explained. The opening of the front and rear doors withdraws the hooks from engagement with the rods P, releasing the side doors, permitting them also to be thrown down or opened, all the doors, by preference, turning upon horizontal pivots connecting their lower ends with the frame-posts.

A cam projection or incline, $D^3$, on the rod $D^2$, as the plunger is completing its downward throw, acts on the lever I for again reversing the movement of the screws and setting them in operation to compress a bale. A pivoted elbow-lever or other suitable device may, if preferred, be used in lieu of the cam $D^3$ for operating lever I.

The adjustment of the blocks $m'$, which act on the slides N, and of the length of the arms $p$ and $p'$ of the latch-rods P, as explained, adapts the doors to be automatically released at any desired point in the throw of the plunger, for increasing or diminishing the size of the bale at will.

Parts of the press not particularly described herein may be constructed as described in my former patent referred to, or in any usual or suitable manner.

Having now described my improvement, what I claim as new is—

1. In a hay or cotton press, the frame-posts, made in sections and divided longitudinally, in combination with the through-bolts uniting them to each other and to the horizontal frame-pieces, substantially as described.

2. The frame-posts or uprights, made in sections and divided longitudinally, in combination with the clamping-cups or socket-pieces $a$ and the through-bolts for uniting said parts and the transverse frame-pieces, substantially as described.

3. The combination, with the movable bed or plunger C, of the cross-head D, the uprights $D'$ and $D^2$, rigidly connecting said plunger and cross-head, the screws B and $B'$, the actuating combined spur-gears and nuts E and $E'$, and the intermediate pinion, $G'$, for operating said combined gears and nuts and moving the screws simultaneously in the same direction and at the same speed.

4. The bevel-pinions $h$ and $h'$ for actuating the compressing mechanism, as described, in combination with the sliding clutch $H'$, shifting-lever I, and the lever J, connected to said lever I, and arranged to be acted upon by the press-door for automatically reversing the movement of the plunger when the operation of compressing the bale is completed.

5. The doors provided with the angle-irons or hooks, in combination with the latch-rod provided with arms for engaging said hooks, and connected with slides operated upon by the compressing mechanism for automatically releasing or unlocking the press-door, substantially as described.

6. The mechanism for unlocking the press-doors, connected with and operated by the compressing devices, in combination with mechanism for reversing the movement of the plunger, arranged and operating substantially as described, whereby the opening of the press-door is made to simultaneously and automatically reverse the movement of the compressing mechanism.

7. The rotating combined gear and nut E, provided with the shouldered hub $e$ and sleeve $e^2$, in combination with the correspondingly-socketed and annularly-flanged gear-plate forming bearings for the support of said gear and nut against end and lateral thrust, substantially as described.

8. The latch-rod or shaft P, provided with the arms $p$ and $p'$ for engaging the hooks $q$ and $q'$, and with the collar $p^2$ for preventing end movement of said rod P in its bearings, substantially as described.

9. The combination, with the shipping-lever I, of the lever J, adapted to be operated automatically for reversing the direction of rotation of the screws at the end of their throw in one direction, and the cam or incline $D^3$ for automatically actuating the lever J and reversing the direction of rotation of the screws at the end of their throw in the opposite direction, substantially as described.

In testimony whereof I have hereunto set my hand this 4th day of December, A. D. 1882.

WALTER J. F. LIDDELL.

Witnesses:
WARREN C. STONE,
REX. SMITH.